United States Patent [19]

Redmon, Jr. et al.

[11] Patent Number: 5,161,756
[45] Date of Patent: Nov. 10, 1992

[54] THERMALLY ISOLATED VARIABLE DIAMETER DEPLOYABLE SHIELD FOR SPACECRAFT

[75] Inventors: John W. Redmon, Jr., Huntsville; Andre E. Miller; Bobby E. Lawson, both of Madison; William E. Cobb, Cullman, all of Ala.

[73] Assignee: United States of America, Washington, D.C.

[21] Appl. No.: 691,610

[22] Filed: Apr. 18, 1991

[51] Int. Cl.⁵ ............................................. B64G 1/00
[52] U.S. Cl. ............................. 244/158 R; 244/158 A; 244/121; 244/173
[58] Field of Search ............... 244/158 A, 158 R, 121, 244/159, 160, 163, 173

[56] References Cited

U.S. PATENT DOCUMENTS

| | | | |
|---|---|---|---|
| 3,863,870 | 2/1975 | Andrews et al. | 244/173 |
| 4,030,102 | 6/1977 | Kaplan et al. | 244/173 X |
| 4,133,501 | 1/1979 | Pentlicki | 244/173 |
| 4,947,174 | 8/1990 | Lehman et al. | 244/121 X |

Primary Examiner—Joseph F. Peters, Jr.
Assistant Examiner—Christopher P. Ellis

[57] ABSTRACT

A thermally isolated deployable shield for spacecraft is provided utilizing a plurality of lattice panels stowable generally against the craft and deployable to some fixed distance from the craft. The lattice panels are formed from replaceable shield panels affixed to lattice structures. The lattice panels generally encircle the craft providing 360 degree coverage therearound. Actuation devices are provided for translating the shield radially outward from the craft and thermally isolating the shield from the craft. The lattice panels are relatively flexible, allowing the shield to deploy to variable diameters while retaining uniform curvature thereof. Restraining devices are provided for holding the shield relatively tight in its stowed configuration. Close-out assemblies provide light sealing and protection of the annular spaces between the deployed shield and the crafts end structure.

26 Claims, 8 Drawing Sheets

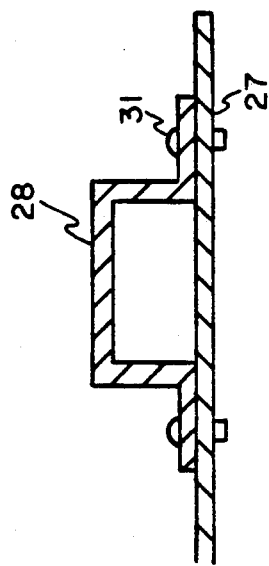
FIG. 2B A-A
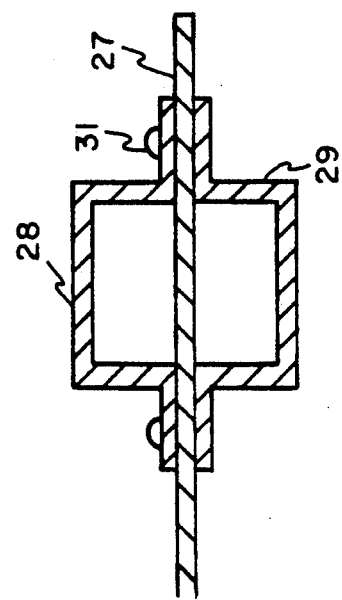
FIG. 2C B-B
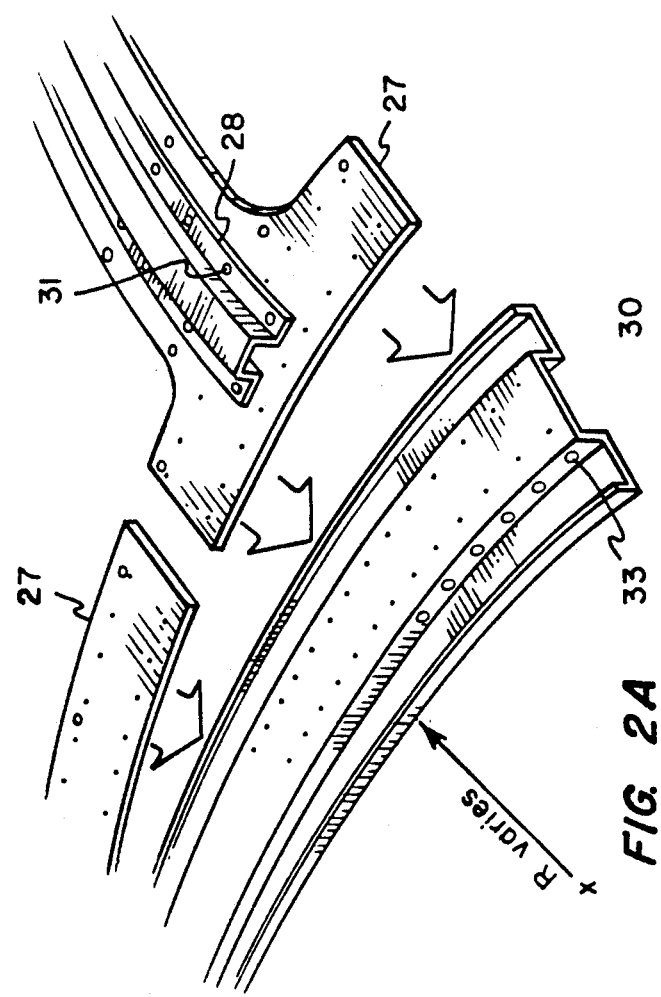
FIG. 2A

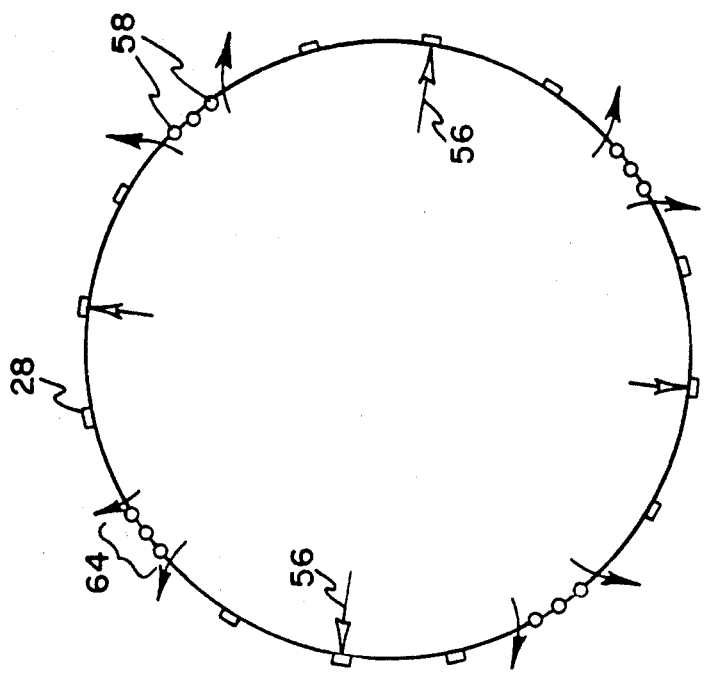
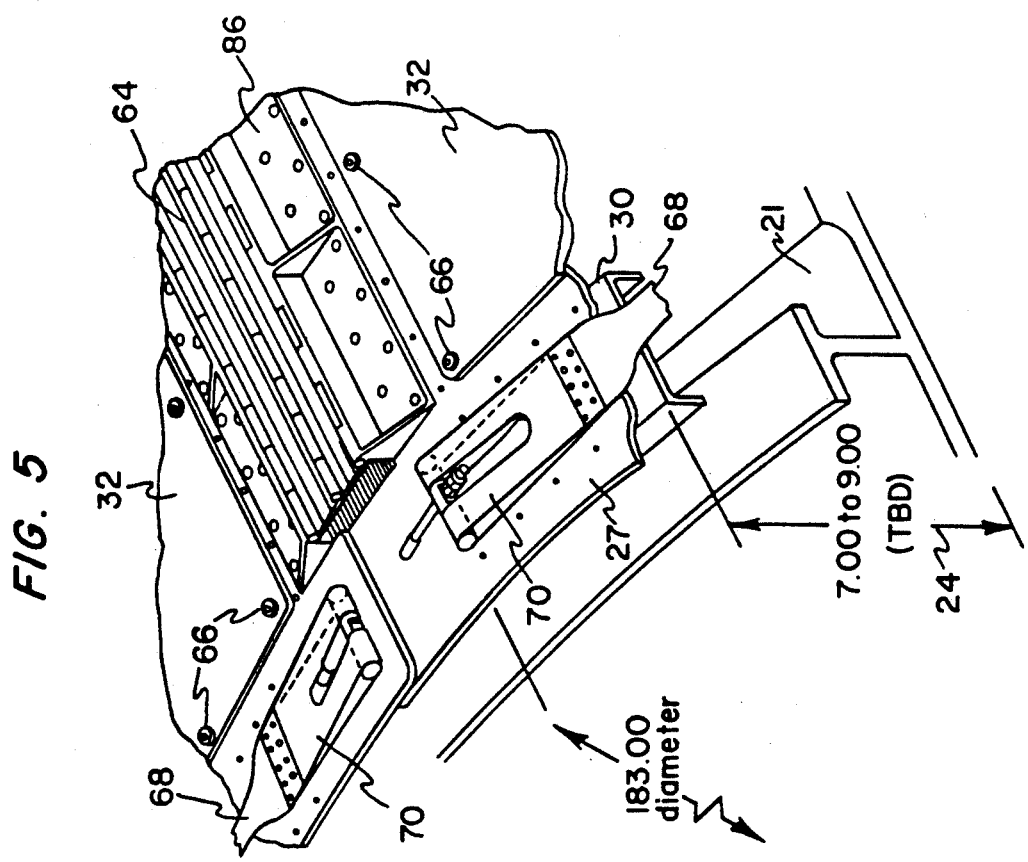

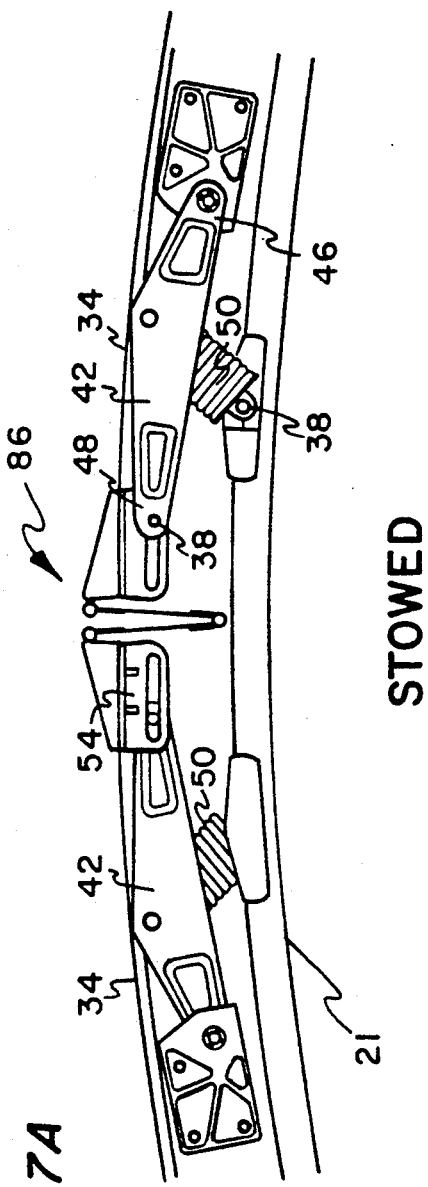
FIG. 7A  STOWED
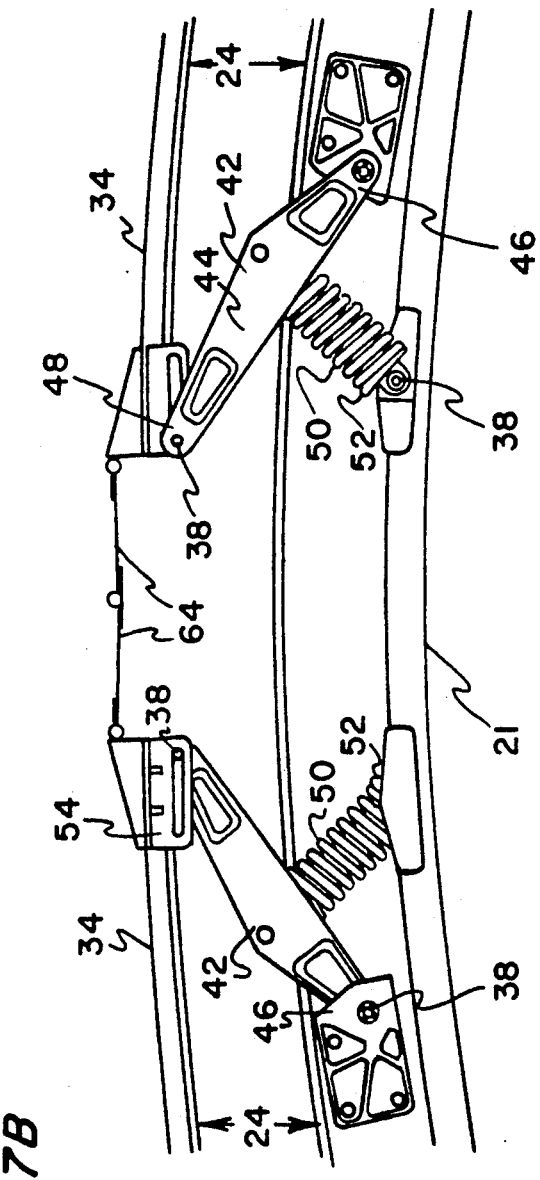
FIG. 7B

THERMALLY ISOLATED VARIABLE DIAMETER DEPLOYABLE SHIELD FOR SPACECRAFT

ORIGIN OF THE INVENTION

The invention described herein was made by employees of the United States Government and may be manufactured and used by or for the Government for governmental purposes without the payment of any royalties therein or therefor.

BACKGROUND OF THE INVENTION

The present invention generally concerns a thermally isolated deployable meteoroid/debris shield for spacecraft in general, and more particularly concerns a weight efficient deployable shield of segments providing 360 degree coverage of a cylindrically shaped spacecraft such as Space Station, while at the same time providing a superior thermal barrier to conductive and radiative heat losses to "cold space" from the spacecraft's internal environment.

Spacecraft destined for long term orbital use must be provided with meteoroid/debris impingement protection. Several factors necessitate this protection: First, the statistical likelihood of meteoroid impingement with long term use; Second, the increasingly larger amounts of orbital space debris released from earth launched spacecraft activity; and Third, the general trend to enhance meteoroid/debris impingement survivability reliability from safety, cost, and weight standpoints.

Additionally, it is an important concern to provide a thermal barrier to internal environment heat loss to "cold space" through conductive and radiative modes, or interface points, existing between the pressurized environment and the meteoroid shield, whether the shield is deployed or fixed. Typically, this has not been as critical of a concern. However, with the advent of Space Station and the opportunity for sustained manned space missions, an effective thermal barrier is a critical requirement. This concern pertains to environmental control system (ECS) sizing, control, power, weight, etc., as well as dew formation, cleanliness, and microbial growth environments. Thus it is important to minimize the interface conductivity through reduction of conduction paths and/or lowering of interface structure/mechanism conductivity, for example through isolation and/or insulation of these interface points.

There are several examples of other methods providing a thermally isolated shielding protection scheme. However, these methods were neither designed for nor adequate for the stringent weight, thermal, and ballistic protection requirements that are so intensive to the thirty year mission of the space station. An example of one such scheme can be seen in the Skylab protection device. Skylab utilized eight individual rigid panels per circumference, or circular cross section. Each individual panel consisted of skin, structure, crank links, prime mover, as well as peripheral elements such as brackets, bearing blocks, light seals, closeouts, skirting, etc. The entire system was retained during ascent with highly loaded, pyro-released tension bands. The system was inherently "heavy" due to the aerodynamic loading and restraint scheme. The eight panel deployment scheme was somewhat complex and possessed a large quantity of components, resulting in reduced reliability of the system.

Another method of providing meteoroid protection is to size the pressurized environment wall thickness to withstand penetration. This method, being extremely heavy, is simply inadequate from a weight sufficiency standpoint for utilization with Space Station.

The use of fixed shields in general is known in the art, but this method is also inadequate. Fixed shields require a large quantity of fastening interfaces resulting in poor thermal characteristics. The fixed shields also exhibit poor ballistic impingement properties.

U.S. Pat. No. 4,314,682 to Barnett et al. discloses a spring loaded mechanism for deploying a shield from a space vehicle. The means for deploying the shield includes a plurality of elongated spring members extending outwardly from the body of the space vehicle and a plurality of curved ribs having their ends connected to ends of the extending elongated members. When deployed, the shield is in the general form of an open shell or bathtub-like structure with end caps at each end, the space vehicle residing within the structure. The shielding material itself is highly flexible radar attenuating material which, prior to deployment, is packed and folded into a jettisonable pod carried along one side of the space vehicle. When the shield is stowed, the spring members are wrapped downwardly around the circumference of the vehicle and held in place by the pod. The shield spontaneously deploys when the pod is jettisoned releasing the spring members which are attached to the shielding material.

U.S. Pat. No. 4,919,366 to Cormier discloses a heat resistive wall assembly for space vehicles comprising an inner wall of wrought beryllium or aluminum providing structural support for the vehicle, and an outer wall of interlocking panels of a honeycomb laminate of heat resistive material. An evacuated jacket of insulating material is disposed between the inner and outer walls. The space between the inner and outer walls that is not contained within the evacuated jacket is vented to ambient atmosphere.

U.S. Pat. No. 4,578,920 to Bush et al. discloses deployable truss structure having first and second spaced surface truss layers. A passive spring positioned about an elongated shaft serves as the expansion force to move the folded struts from a stowed collapsed position to a deployed operative final truss configuration.

U.S. Pat. No. 4,166,598 to Seifert et al. discloses a stowable and inflatable vehicle enshrouding apparatus adapted for use in retaining heat emitted by a large, relatively hot space vehicle. The apparatus includes an inflatable framework external of which is attached a multilayer superinsulating blanket shroud attached to the inflatable members which comprise the frame. The apparatus is deployed by removing it from stowage and inflating the inflatable support members.

U.S. Pat. No. 4,164,339 to McClenny discloses an environmental protection system comprising sheets of thermal insulators superposed one upon the other and deployed over the surface to be protected. A "dead space" thermal insulation, such as a vacuum or simply a high resistance physical separation, is provided between the surfaces. The separation is effected by flaps actuated by an aerodynamic or forced airstream or by the static energy stored in uncoiled flaps. The insulating material is stored on reels and deployed by automatic or manual means.

U.S. Patent No. 4,009,851 to Cable discloses a spacecraft structure having a hollow inner cylindrical member and a plurality of planar bulkheads secured to the outer surface of the inner member and extending radially outward from the inner member. A plurality of planar enclosure panels are secured to the extended edges of the bulkheads and each other to form and enclosed spacecraft structure.

U.S. Pat. No. 4,730,797 to Minovitch, U.S. Pat. No. 3,547,375 to Mackey, and U.S. Pat. No. 3,064,317 to Dobson all relate generally to the field of the present invention.

SUMMARY OF THE INVENTION

An object of the present invention is to provide a thermally isolated deployable shield for spacecraft.

Another object of the present invention is to provide a shield suitable for use with a long term orbital craft.

Yet another object of the present invention is to provide a weight efficient and cost effective shield exhibiting superior thermal barrier capabilities.

Still another object of this invention is to provide a shield exhibiting superior meteoroid and debris impingement protection.

Still another object of this invention is to provide a shield enhancing meteoroid and debris survivability reliability taking into consideration safety, cost, and weight factors.

A further object of the present invention is to provide a shield designed for the stringent weight, thermal, and ballistic protection requirements of the extended life mission of the Space Station.

Another object of the present invention to provide a thermal barrier for a spacecraft to internal heat losses to "cold space."

Yet another object of this invention is to provide means for thermally isolating a deployable shield utilizing minimum shield/craft interfaces.

And still a further object of the present invention is to provide a shield of relatively flexible panels capable of changing curvature thus giving the shield variable diameter capability.

Yet another object of this invention is to provide a deployable shield utilizing flexible structural elements thereby enhancing the shield's weight efficiency.

A further object of this invention is to provide a deployable shield utilizing the minimum number of panels and peripheral components for weight and reliability considerations.

Another object of the present invention is to provide a deployable shield allowing for shield material thickness downsizing as a result of vessel/shield spacing.

Still another object of the present invention is to provide a more weight efficient shield as the result of the enhanced protection gained from enhanced shield spacing.

A further object of the present invention is to provide a shield end close-out assembly for annular space light sealing and protection utilizing a simplistic design of flexible elements.

Yet another object of the present invention is to provide an improved system for deploying shields from a craft.

These and other objects, aspects, and features of this invention are more particularly discussed and described in the remainder of the specification. Various modifications and alterations to the features, elements, and constructions disclosed herewith may occur to those of ordinary skill in the art, and are intended to come within the spirit and scope of this invention by virtue of present reference thereto. Such modifications and variations may include, but are not limited to, the substitution of functionally equivalent structures and elements for those expressly disclosed, illustrated, or suggested herewith, as well as the interchange of various features and elements previously disclosed. Embodiments of the present invention may also include the elements, and their functional equivalents, disclosed and discussed herein in any combination or standing alone.

Further, it should be understood that, although the present invention is illustrated with and generally discussed in relation with cylindrical craft, this is for ease and clarity of explanation and is not meant to be a limitation of any kind. The scope and spirit of the present invention is not limited to cylindrical shapes and encompasses, for example, conical or truncated conical shapes such as those found in missile nose cones. The invention may be employed as a protection scheme for any space vehicle or payload in which the launch configuration constrains the maximum envelope required to provide adequate protection for the minimum weight. For example, this invention would be just as suited for any Shuttle or expendable booster launched satellite.

Still further, it is to be understood that different embodiments, as well as different presently preferred embodiments, of this invention may include various combinations of presently disclosed features, or their equivalents (including combinations thereof not expressly shown or stated). In accordance with one exemplary preferred embodiment of the present invention, a thermally isolated variable diameter deployable spacecraft shield is provided which is stowable generally adjacent the craft and deployable to a fixed distance from the craft. The shield generally comprises a plurality of relatively flexible lattice structures capable of flexing to varying curvatures; replaceable shield panels removably attached to the lattice structures, such lattice structure and attached shield panels comprising a lattice panel; securing means for removably securing the shield panels to the lattice structure, the securing means allowing the panels to flex in conjunction with the lattice structure; actuation means for securing the lattice panels relative the craft and for driving the lattice panels a set distance from the craft; and restraining means holding the shield relatively tight against the craft prior to deployment thereof.

In a preferred embodiment of the present invention, the lattice structure comprises a lattice web with relatively rigid longitudinal members and relatively flexible ring members affixed to the lattice web. The rigid longitudinal members may further comprise an upper longitudinal member and a lower longitudinal member. The lower longitudinal member is preferably utilized along the lattice structure's sides and centerline.

In another preferred embodiment of the present invention, four 90 degree lattice panels are utilized providing 360 radial coverage around the craft. Further, in another preferred embodiment, folding hinge assemblies are disposed between and attached to the lattice panels whereby upon deployment of the shield the hinge assemblies expand between the lattice panels thereby comprising make-up shielding material between the lattice panels and providing continuous 360 radial coverage.

Preferably, the lattice panels are thermally isolated from the craft's structural framework. In one preferred embodiment, this is accomplished by the actuation means comprising a minimum number of thermal interfaces between the craft and shield. These thermal interfaces can preferably include bearing elements having minimum roller/race interface areas.

In another exemplary embodiment according to the present invention, the actuation means include a plurality of spring actuators. More specifically, a set of medial actuators may be provided disposed longitudinally relative the craft and lattice panel along the panel's centerline, preferably along the centerline lower longitudinal member. Preferably, the medial actuators are employed in opposing groups of two to provide a balanced deploying force. Upon deployment, the medial actuators translate the lattice panel outward a fixed distance dictated by the actuators. A set of side actuators are provided disposed generally equally along the lattice panel's sides, preferably along the side lower longitudinal members, and oriented perpendicular to the medial actuators. Upon deployment, the side actuators locate the edges of the lattice panel radially outward matching the deployed distance of the medial actuators, with the entire panel then having a larger uniform curvature.

In another preferred exemplary embodiment according to the present invention, the spring actuators are nonslidably secured to the craft's structural framework and slidably secured to the shield's lattice structure by means of thermally isolating bearing elements.

In yet another preferred embodiment in accordance with the present invention, the deployable shield further includes a plurality of flexure close-out assemblies providing light sealing and protection of the annular areas between the deployed shield and the craft's end structure.

In accordance with the present invention, apparatus for deploying panels of a craft's variable diameter deployable shield is provided, comprising medial spring actuators oriented longitudinally relative said craft and said panel, said medial actuators being slidably secured to the centerline of said panel and nonslidably secured to said craft's framework so that upon deployment said medial actuators translate said panel outward a fixed distance from said craft; and side actuators oriented perpendicular to said medial spring actuators and located generally equally spaced along said panel's edges, said side actuators slidably secured to said panel's edges and nonslidably secured to said craft's framework so that upon deployment said side actuators locate the edges of said panel radially outward matching the fixed distance of said panel when deployed. The actuators are preferably secured with thermally isolating bearing elements having minimum roller/race interface areas.

In further accordance with the present invention, a flexure close-out assembly is provided for incorporation with a craft's variable diameter deployable shield, said assembly disposed generally at the ends of said shield between said shield and said craft and capable of flexing with said shield upon deployment thereof providing annular space light sealing and protection, comprising a plurality of flexure elements having cut-out reliefs permitting said flexure elements to flex with the change in curvature of said deployable shield; and attaching means, between the cut-out reliefs, for attaching said flexure elements to said shield generally at the ends thereof and to said craft's close-out and light seal assembly.

BRIEF DESCRIPTION OF THE DRAWINGS

The accompanying drawings, which are incorporated in and constitute a part of this specification, illustrate embodiments of the present invention, including the best mode thereof, and together with the description, serve to explain the principles of the invention.

FIG. 2A illustrates a partial perspective view of an embodiment of the lattice structure according to the present invention.

FIG. 2B is a component cross-sectional view of the lattice web and upper longitudinal member of the present invention, taken along line A—A in FIG. 1.

FIG. 2C is a component cross-sectional view of the lattice web and upper and lower longitudinal members of the present invention, taken along line B—B in FIG. 1.

FIG. 5 is an enlarged partial perspective view of the present invention similar to that shown in FIG. 3, and depicting the shield in its deployed configuration.

FIG. 6 is a schematic cross-sectional view of the shield features of the present invention shown in the deployed configuration, apart from a craft as in FIG. 4.

FIG. 7A is a partial side view of an exemplary embodiment of the present invention, which may be practiced alone or in combination with other present features, illustrating the hinge assembly and side spring actuators in the stowed configuration.

FIG. 7B is a partial side view similar to that of FIG. 7 depicting the apparatus in the deployed configuration.

Figure 1:
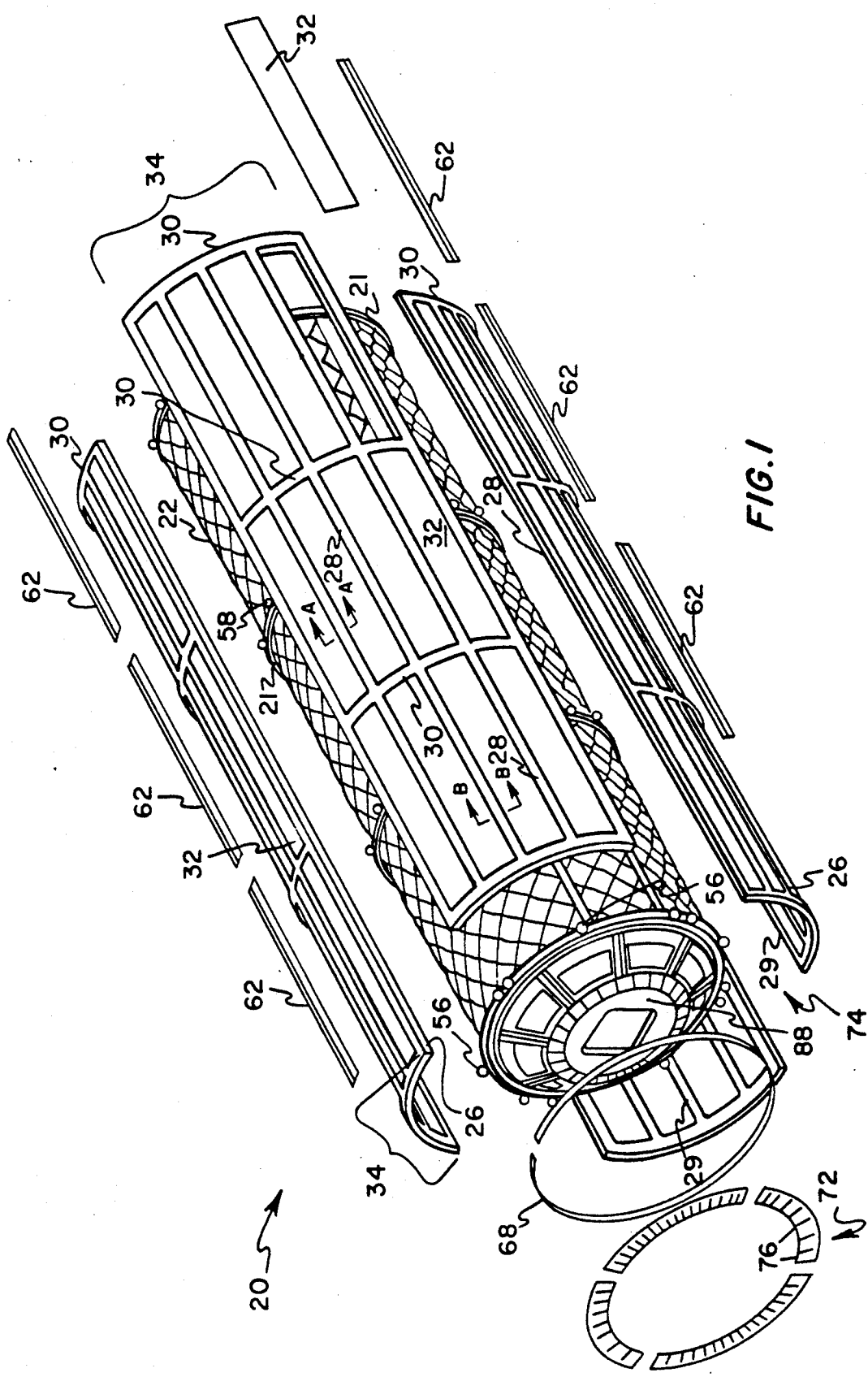
FIG. 1 is a component, exploded perspective view of an exemplary embodiment of the present invention.

Repeat use of reference characters in the following specification and appended drawings is intended to represent the same or analogous features or elements of the present invention.

DETAILED DESCRIPTION OF THE PREFERRED EMBODIMENTS

Reference will now be made in detail to the present preferred embodiments of the invention, examples of which are illustrated in the accompanying drawings. The following disclosure is for purposes of example only, and is not intended to limit broader aspects of the invention embodied thereby.

Referring in greater detail to the figures, a thermally isolated variable diameter deployable shield, generally 20, according to the present invention, has a stowed configuration generally adjacent craft 22 and a deployed configuration at some fixed distance 24 from craft 22. Shield 20 thus can assume any diameter from its stowed configuration to its deployed configuration. Distance or space 24 between shield 20 and craft 22 is crucial to the present invention. See, for example, exemplary nominal distance indications on present FIG. 8. By deploying shield 20 some fixed distance 24, impinging particles, such as meteoroids and debris, upon contact, fragment into very small low velocity particles with a lowered (noncritical) normal to spacecraft wall energy flux which essentially dissipate in space 24.

Distinct weight advantages are gained as the result of the enhanced protection afforded by increased shield spacing 24. Generally, a craft's shield must have a certain "theoretical" thickness for impingement survivability probability requirements. The shield thickness can, however, be downsized as the shield is moved away from the craft while maintaining essentially the same survivability probability.

Deployed distance 24 is also critical to the thermal isolation characteristics of shield 20. The design of deploying shield 20 at a fixed distance 24 allows for low thermal conductivity craft/shield interfaces, fewer conduction mode heat transfer paths, and conduction paths which are long and tortuous and have many contact resistances.

Shield 20, according to the present invention, comprises a plurality of relatively flexible lattice structures 26. As embodied herein and shown for example in FIG. 1, lattice structures 26 generally encircle craft 22 providing essentially 360 degree structural coverage therearound. In the preferred embodiment, only four 90 degree structures 26 are utilized, significantly increasing the weight efficiency and reliability of shield 20. Structures 26 are oriented generally along the longitudinal axis of craft 22. Preferably, structures 26 are of essentially the same length as craft 22 to be enclosed. However, this is not meant to be a limitation. More than one lattice structure 26 could be used to "cover" the length of craft 22.

Lattice structures 26 exhibit a high degree of longitudinal stiffness, but are tailored to exhibit flexibility along their arclength, thus having the ability to change curvature as they are deployed out to a larger diameter. Therefore, lattice structure 26 can be restrained at a small diameter (stowed configuration) and deployed outward to a larger diameter with the flexure allowing for curvature correction and uniform radial spacing. This principle is illustrated in FIGS. 3 through 6.

As embodied herein and shown for example generally in FIGS. 2A, 2B, and 2C, lattice structure 26 preferably comprises a lattice web 27. This web 27 provides a skeletonal frame to which is affixed relatively rigid upper longitudinal members 28, relatively rigid lower longitudinal members 29, and ring members 30. Rivets 31, or any other suitable attaching means, may be utilized for attaching the members. Lower longitudinal members 29 are preferably provided along the sides and centerline of lattice structure 26, as illustrated in FIGS. 1 and 2C. Although shown in the Figures as being affixed to the "underside" of lattice web 27, ring member may 30 may alternately be affixed to the top side of web 27, similar to upper longitudinal member 28.

Because lattice structure 26 is firmly restrained against craft 22 structural framework 21 in the stowed configuration, the flexibility characteristics do not contribute to any ascent (i.e., during lift-off) vibration problems; and once deployed in the vacuum of space, there are no "forcing functions" to drive any vibrations of lattice structure 26. The degree of flexure of lattice structure 26 is accomplished by elastically straining ring members 30 from a near-to-deployed configuration shape down to the stowed configuration shape, utilizing the strain energy of ring members 30 as the curvature correcting force. This can entail varying the moment of inertia (I) of ring members 30 along the arclength such that structure 26 deploys concentrically with respect to craft 22. Moment of inertia (I) of ring members 30 may be varied by drilling holes 33 or slots in ring member 30, as depicted in FIG. 2A.

Shield 20 of the present invention further includes replaceable shield panels, generally 32, removably attached to lattice structure 26, forming a lattice panel 34. As embodied herein and shown for example in the Figures, shield panels 32 are generally attached to lattice web 27, essentially "filling in" lattice structure 26. Shield panels 32 may also be attached directly to upper longitudinal members 28 and ring members 30. Together, lattice structure 26 and shield panels 32 form a continuous lattice panel 34. A plurality of lattice panels 34 generally encircle craft 22 providing 360 shielding protection. In a preferred embodiment of the present invention, four 90 degree lattice panels are utilized.

Figure 3:
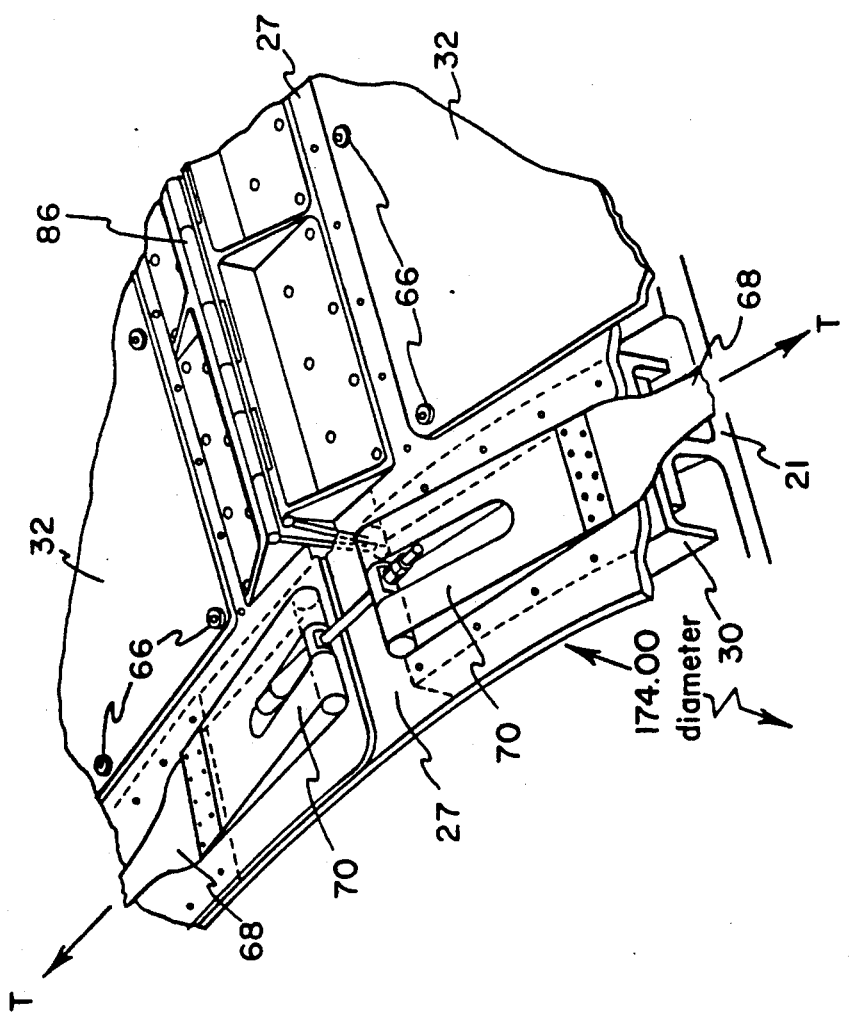
FIG. 3 is an enlarged partial perspective view of an exemplary arrangement of the hinge assembly, tension band, and tension bolt assembly shown in an exemplary stowed configuration in accordance with the present invention.

Shield panels 32 are essentially sacrificial panels providing meteoroid and debris protection to craft 22. Panels 32 can be fabricated from many known suitable materials, such as 6061-T6 aluminum, with weight and strength being the major design considerations. Should a panel 32 be damaged by meteoroid "hits", it is readily replaceable by on-orbit changeouts. Hence, means are provided for removably securing shield panels 32 to lattice structure 26. In the preferred embodiment of the present invention, shield panels 32 are attached to lattice structure 26 with quick acting floating fasteners 66, as depicted in FIGS. 3 and 5, which allow shield panels 32 to flex in conjunction with lattice structure 26. Fasteners 66 are generally known in the art and any such fastener providing a relatively bind-free interface between shield panels 32 and lattice structure 26 are within the scope of this invention.

Shield 20 of the present invention further comprises actuation means which secure lattice structure 26 relative craft framework 21 and provide means for driving lattice panels 34 outward fixed distance 24 from craft 20. As embodied herein and shown for example in FIGS. 2 through 8, the actuation means may preferably comprise a plurality of spring actuators 42 for each lattice panel 34. Spring actuators 42 dictate fixed distance 24 lattice panels 34 will be deployed from craft 22.

Spring actuators 42 may comprise a spring loaded pivot arm 44 which has a pivot end 46 and a shield end 48. Pivot end 46 is nonslidably attached to craft framework 21, with shield end 48 being slidably attached to lattice structure 26, preferably to lower longitudinal members 29 along the sides and centerline of lattice structure 26. A slotted trunnion bracket 54 or other equivalent means may be employed for slidably attaching shield end 48. Bracket 54, or other attaching means, may constitute an integral component of lower longitudinal member 29 or, in the alternative, comprise a separate component affixed to longitudinal member 29.

Telescoping arm 52 resides generally within a spring mechanism 50, being pivotally attached to pivot arm 44, preferably with monoball link 94 or equivalent means, and craft framework 21. Telescoping arm 52 locates spring assembly 50 between pivot arm 44 and craft framework 21, with spring assembly 50 providing the motive force urging pivot arm 44 away from craft 22. The degree of "telescoping" of arm 52 defines fixed distance 24 lattice panels 34 will be deployed. Particularly, telescoping arm 52 has stop elements at the proper extension length thereof limiting its telescoped length and defining the radial distance shield end 48 of pivot arm 44 will be deployed outward from craft 22.

Figure 8:
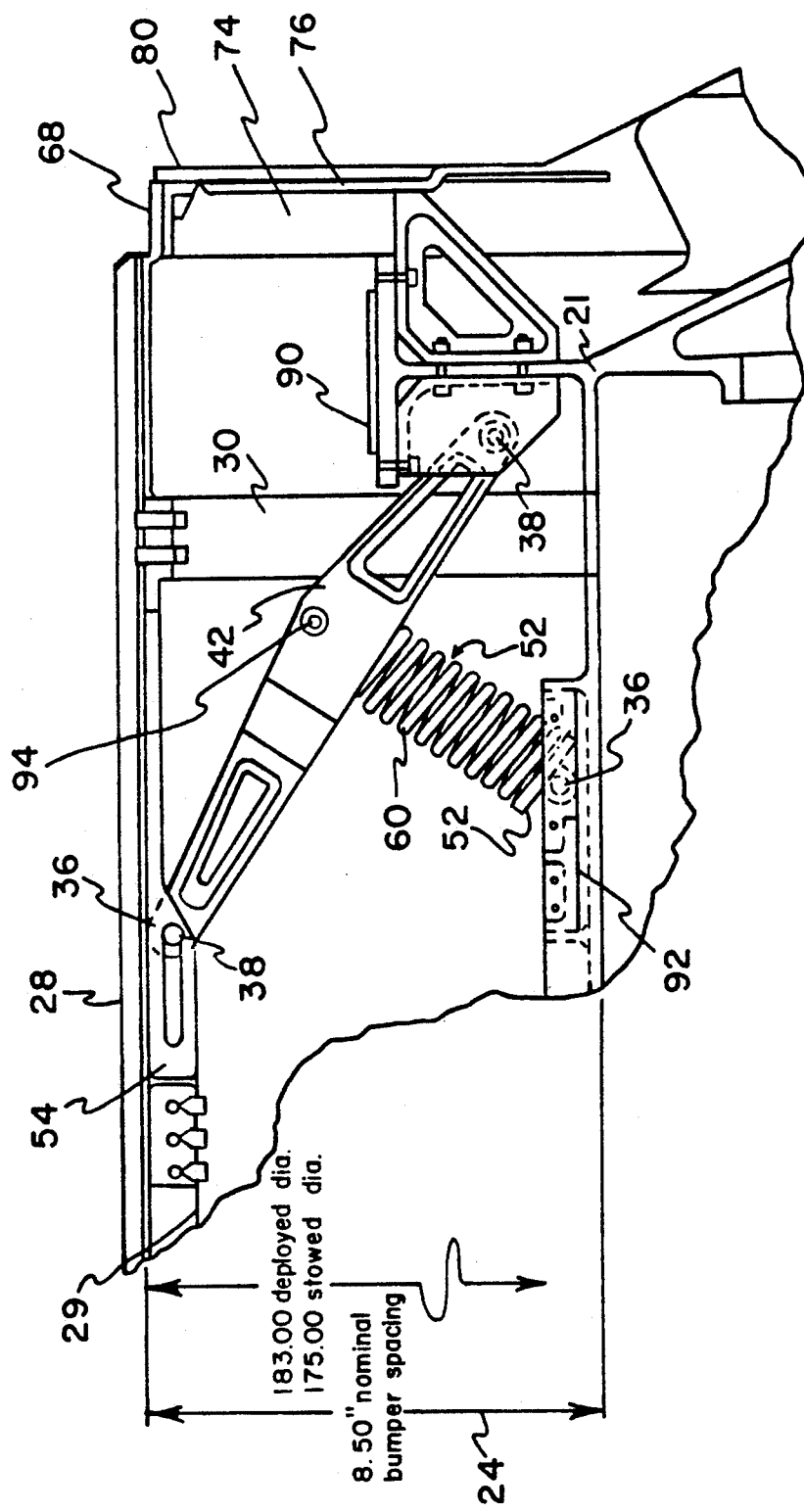
FIG. 8 is a component perspective view of an embodiment of the present invention, which may be practiced alone or in combination with other present features, depicting apparatus for deploying panels of a deployable shield, particularly illustrating the thermal interfaces and spring prime movers in accordance with the present invention.

Spring assembly 50 may comprise a helical compression spring 60, as depicted in FIG. 8, or concentric double spring assembly (not depicted in the Figures). Any other suitable spring arrangement sufficing for urging pivot arm 44 away for craft 22 is within the scope of the invention.

In the preferred embodiment of the present invention, lattice panels 34 are thermally isolated from craft 22. This is accomplished by providing a minimum amount of thermal interfaces between panels 34 and craft framework 21. "Minimum" here refers to the least number of interface points required to adequately secure panels 34 relative the craft. As embodied herein and shown for example in FIGS. 7A, 7B, and 8, spring actuators 42 are affixed to craft framework 21 and lattice structure 26 with thermally isolating bearing elements 38. Bearing elements 38 provide nearly the absolute minimum thermal interface 36 between panels 34 and craft framework 21. Use of ball, roller, or needle bearings provide an infinitely small conduction path cross-sectional area at the bearing element 38 roller/race interface. Thermal/-vacuum tests have recorded conductance values as low as 0.01 btu/hr-degree F for appropriately sized deep groove ball bearings.

Figure 4:
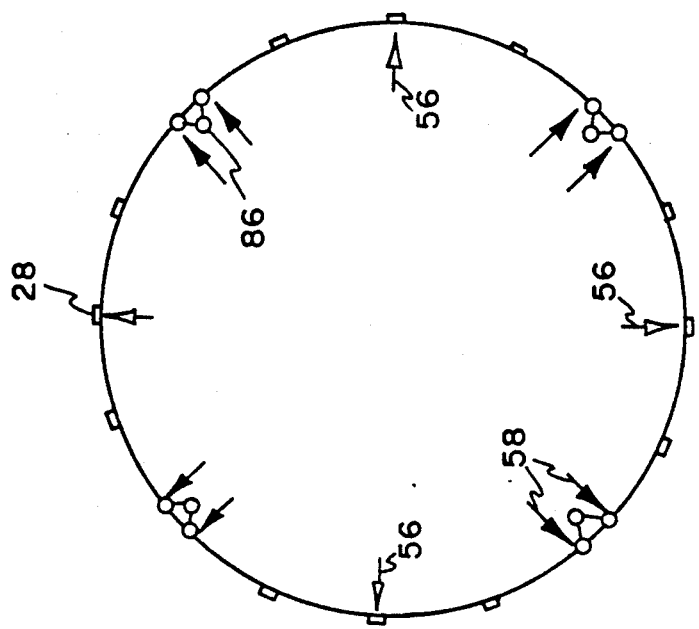
FIG. 4 is a schematic cross-sectional view of the shield features of the present invention shown in the stowed configuration, apart from a craft for clarity in illustration.

In another preferred embodiment of this invention, as depicted generally in FIG. 1 and schematically in FIGS. 4 and 6, spring actuators 42 comprise a plurality of medial actuators 56 and a plurality of side actuators 58. This embodiment also stands alone (i.e., can be used apart from other present features) as a preferred embodiment of the present invention. Medial actuators 56 are oriented longitudinally relative craft 22 and lattice panel 34, being slidably attached to lattice structure 26 at its centerline lower longitudinal member 29. Side actuators 58 are oriented perpendicular to medial actuators 56 and spaced generally equally along the side edges of lattice structure 26, preferably along the side lower longitudinal members 29, and attached in the same manner as medial actuators 56, both of which are preferably attached with thermally isolating bearing elements 38.

It is preferred that medial actuators 56 be employed in opposing groups of two to ensure a balanced deploying force. In a most preferred embodiment of the present invention, four medial actuators 56 and eight side actuators 58 are provided for each lattice panel 34.

Upon actuation, or deployment of shield 20, medial actuators 56 translate the center of lattice panel 34 radially outward away from craft 20. Side actuators 58 simultaneously urge the sides of lattice panel 34 radially outward the same extent that medial actuators 56 translate the centerline of panel 34, thereby providing for uniform change in curvature of lattice panel 34 to its deployed diameter. This operation is illustrated generally in FIGS. 3 through 8.

In the most preferred embodiment of the present invention, shield 20 further includes hinge assemblies 62 disposed between and affixed to lattice panels 34. As embodied herein and shown for example in FIGS. 3 through 7B, hinge assembly 62 preferably comprises an accordion-like or butterfly hinge 86 which is foldable when shield 20 is in its stowed configuration and expandable between lattice panels 34 when shield 20 is deployed. By expanding between lattice panels 34, hinge 86 comprises make-up shield material 64 between lattice panels 34, thus providing for continuous 360 degree shielding around craft 20.

It should be understood that hinge assembly 62 is not limited to mechanical type hinges. A flexible element or like material may also be employed as make-up shielding 64. The only requirement is that the material fold generally upon itself when shield 20 is stowed and expand between lattice panels 34 upon deployment of shield 20.

Shield 20 of the present invention further comprises restraining means holding shield 20 relatively tight against craft 22 prior to deployment thereof. As embodied herein and shown for example in FIGS. 1 through 8, the restraining means preferably comprises at least two tension bands 68 which generally encircle and hold shield 20 against framework 21 of craft 22. In a most preferred embodiment, four tension bands 68 are provided. Tension bands 68 generally encircle craft 22 over ring members 30 of lattice structure 26. The tension force in bands 68 produces a radial load which, with the aid of locating surfaces (i.e., between ring members 30 and craft structure 21), holds lattice panels 34 tight against suitable craft framework structural elements. The amount of tension in an individual band can be as high as 6,000 pounds. The amount of radial holding force depends on the locating surface contact areas between ring members 30 and craft structure 21 and is variable by design.

Shield restraining means may further comprise a pyrotechnically actuated trunnioned tension bolt assembly 70, as illustrated for example in FIGS. 3 and 5. Bolt assembly 70 holds tension band 68 together when shield 20 is in its stowed configuration and, upon actuation thereof, separates releasing band 68 and allowing actuators 42 to deploy lattice panels 34. Tension bolt assembly 70 can be accurately verified with an electrical strain measuring device (resistance gauge) so that repeatable reliable tensioning and uniform structural loading between band 68 can be attained. The pyrotechnic devices of assembly 70 are preferably wired parallel and redundant ensuring simultaneous release of bands 68.

Figure 9:
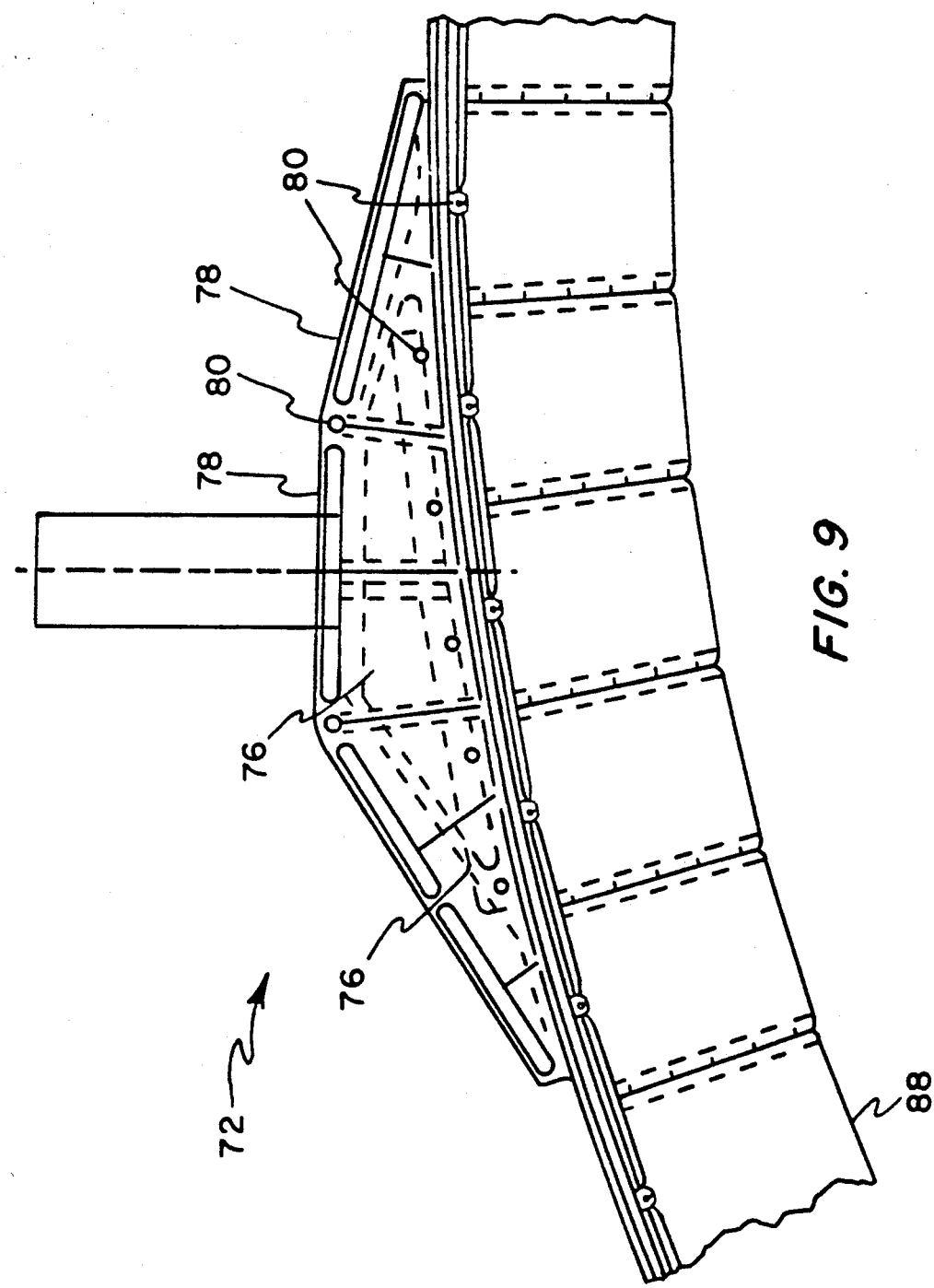
FIG. 9 is a partial component view of an exemplary embodiment of the flexure close-out assembly in accordance with the present invention.
Figure 10:
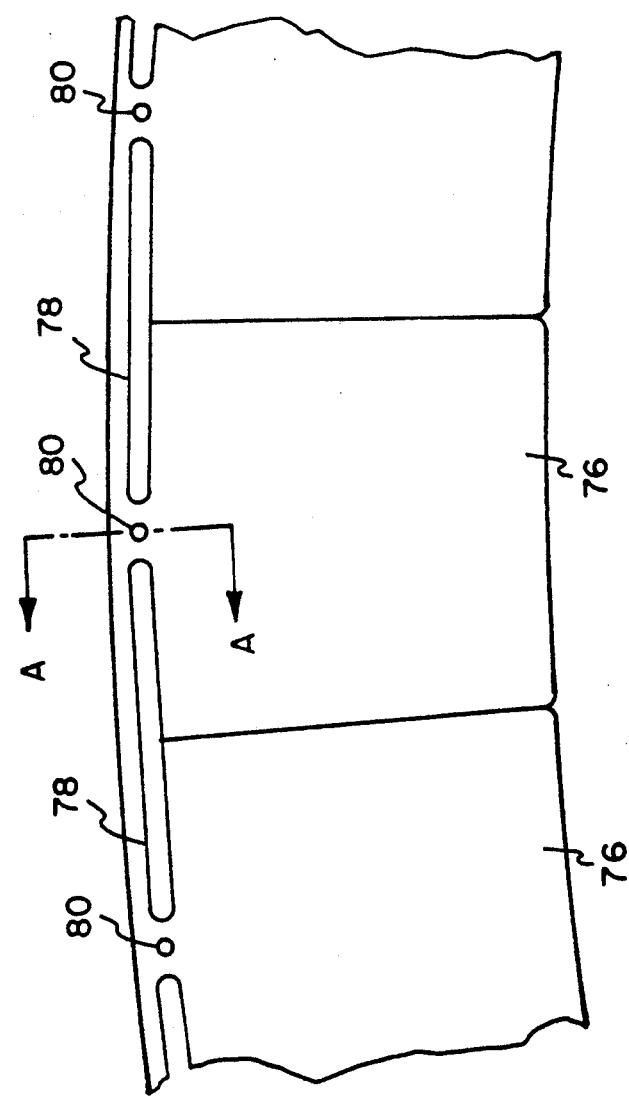
FIG. 10 is an enlarged perspective view of the flexure elements in accordance with the present invention.

In the preferred embodiment of the present invention, shield 20 may further include a plurality of flexure closeout assemblies 72. The operation and apparatus of flexure close-out assemblies 72 further stand alone as a preferred embodiment of the present invention. As embodied herein and shown for example in FIGS. 9 through 11, flexure closeout assemblies cooperate to cover, or "close-out", annular areas 74 that exist around the ends of craft 22 between shield 20 and craft 22 when shield 20 is in its deployed configuration. In a most preferred embodiment, eight flexure close-out assemblies 72 are provided, four for each end. Flexure close-out assembly 72 preferably comprises a plurality of flexure elements 76 having cut-out reliefs 78 which permit elements 76 to "flex" with deploying shield 20 and thus track the change in curvature of lattice panels 34. Use of flexure elements 76 for covering annular areas 74 circumvents much complexity, allows for friction free deployment, and provides significant weight savings.

Flexure elements 76 are attached to lattice panels 34 at the general ends thereof, preferably to the end ring members 30 of lattice structure 26. Flexure elements 76 are attached between each of cut-out reliefs 78. At their other end, flexure elements 76 are attached to craft's 20 closeout assembly 88.

Figure 11:
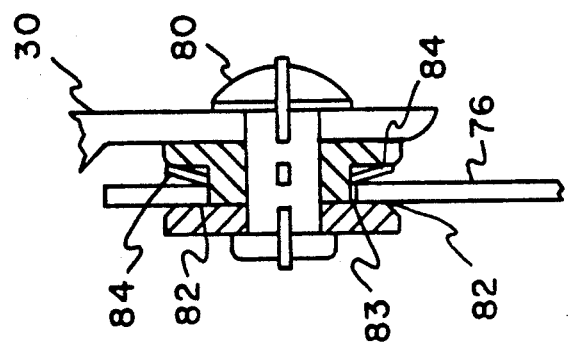
FIG. 11 is an enlarged cross-sectional view of an exemplary embodiment of the bushing arrangement of the present invention, taken along the line A—A in present FIG. 10.

In the preferred embodiment as shown in FIG. 11, bushing arrangement 80 is provided for attaching flexure elements 76 to lattice structure 26. Bushing arrangement 80 comprises thrust surface 82 and spring mechanism 84 which urges flexure element 76 against thrust surface 82 in a nonbinding interface due to adequate diametrical clearance 83 in the bushing flexure element hole.

It is to be understood by those of ordinary skill in the art that the foregoing specification and drawings discussed with reference thereto are only exemplary embodiments of the present invention, with all such language being by way of example only. Individual features and aspects of the foregoing exemplary embodiments may be varied for accommodating alternative applications, all without departing from the spirit and scope of the present invention set forth in the appended claims.

What is claimed is:

1. A thermally isolated variable diameter deployable shield for spacecraft, said shield being stowable generally adjacent said craft and deployable to a fixed distance from said craft, said shield comprising:
   a plurality of relatively flexible lattice structures capable of flexing to varying curvatures;
   a plurality of replaceable shield panels each being removably attached to one of said lattice structures so as to form a lattice panel therewith;
   securing means for removably securing said shield panels to said lattice structure, and for allowing said shield panels to flex in conjunction with said lattice structure;
   actuation means for securing said lattice panels relative said craft and for controllably positioning said lattice panels a fixed distance from said craft; and
   restraining means for holding said shield relatively tight against said craft prior to deployment of said shield.

2. The shield as defined in claim 1 wherein said lattice structure comprises a lattice web to which is affixed relatively rigid upper and lower longitudinal members and relatively flexible ring members.

3. The shield as defined in claim 1 wherein said lattice panels generally encircle said craft providing 360 degree radial coverage thereof.

4. The shield as defined in claim 3 wherein said lattice panels comprise four 90 degree panels providing 360 degree radial coverage.

5. The shield as defined in claim 2 wherein said lattice panels are thermally isolated from said craft's framework.

6. The shield as defined in claim 5 wherein said thermal interfaces comprise bearing elements having minimum roller/race interface.

7. The shield as defined in claim 2 wherein said actuation means comprises a plurality of spring actuators attached to said craft's structural framework and said lattice structure by thermally isolating bearing elements, said actuators defining the diameter of said deployed shield.

8. The shield as defined in claim 7 wherein said spring actuators comprise:
   a spring loaded pivot arm further comprising a pivot end attachable to said craft and a shield end slidably attachable to said lattice structure with said thermally isolating bearing elements;
   a spring assembly; and
   a telescoping arm residing generally within said spring assembly locating said spring assembly relative said pivot arm and said craft, said telescoping arm pivotably secured to said craft and said pivot arm with said thermally isolating bearing elements.

9. The shield as defined in claim 8 wherein said shield end is slidably attached to said lattice structure by means of a bearing element sliding within a slotted trunnion bracket.

10. The shield as defined in claim 9 wherein said spring actuators comprise a plurality of medial actuators disposed longitudinally relative said craft and said lattice panel along said lower longitudinal member centerline of each of said lattice structures, and a plurality of side actuators disposed generally equally along sides of said lattice panels along said lower longitudinal members and oriented perpendicular to said medial actuators.

11. The shield as defined in claim 10 comprising four medial, spring actuators and eight side actuators.

12. The shield as defined in claim 8 wherein said spring assembly comprises a helical compression spring.

13. The shield as defined in claim 8 wherein said spring assembly comprises a concentric double spring assembly.

14. The shield as defined in claim 1 further comprising folding hinge assemblies disposed between and affixed to said lattice panels, said hinge assemblies foldable when said shield is stowed and expandable upon deployment of said shield so as to form make-up shielding material between said lattice panels providing continuous 360 degree radial coverage around said craft.

15. The shield as defined in claim 1 wherein said securing means comprises quick-acting floating fasteners which provide a relatively bind-free interface between said shield panels and said lattice structure.

16. The shield as defined in claim 1 wherein said restraining means comprises at least one tension band which generally encircles and holds said shield against said craft's structural framework, and a pyrotechnically actuated trunnioned tension bolt assembly holding said tension band together, so that actuation of said bolt assembly releases said tension band to allow said shield to deploy.

17. The shield as defined in claim 1 further comprising a plurality of flexure close-out assemblies providing light sealing and protection of annular areas between said deployed shield and an end structure of said craft.

18. The shield as defined in claim 17 wherein said flexure close-out assemblies further comprise a plurality of flexure elements having cut-out reliefs permitting said flexure elements to flex with the varying curvatures of said lattice structure, and means for attaching said flexure elements to the end of said lattice structure and the end close out and light seal assembly of said craft, said attaching means acting between said flexure element cut-out reliefs.

19. The shield as defined in claim 18 wherein said means for attachment of said flexure element comprises a bushing arrangement further comprising a thrust surface and a spring mechanism so that said flexure elements are held against said thrust surface by said spring mechanism.

20. Apparatus for deploying panels of a craft's variable diameter deployable shield from a stowed configuration generally against a craft to a larger diameter deployed configuration at some distance from said craft, said apparatus thermally isolating said panels from said craft, comprising:
- a plurality of medial spring actuators oriented longitudinally relative said craft and said panel, said medial actuators slidably attached to the centerline of said panel and nonslidably attached to framework of said craft so that said medial actuators translate said panel outward a fixed distance from said craft upon panel deployment; and
- a plurality of side actuators oriented perpendicular to said medial spring actuators and located generally equally spaced along sides of said panel, said side actuators slidably secured to edges of said panel and nonslidably secured to said craft framework so that upon deployment said side actuators locate the sides of said panel radially outward matching said fixed distance of said panel when deployed.

21. The apparatus defined in claim 20 whereby said thermal interfaces comprise bearing elements having minimum roller/race interface areas.

22. The apparatus defined in claim 21 wherein said actuators comprise:
- a spring loaded pivot arm further comprising a pivot end attachable to said craft and a shield end slidably attachable to said panel with thermally isolating bearing elements;
- a spring assembly; and
- a telescoping arm residing generally within said spring assembly locating said spring assembly relative said pivot arm and said craft, said telescoping arm pivotably secured to said craft and said pivot arm with said thermally isolating bearing elements.

23. The apparatus as defined in claim 22 wherein said shield end is slidably attached to said panel by means of a thermally isolating bearing element sliding within a slotted trunnion bracket affixed to said panel.

24. The apparatus as defined in claim 22 wherein said spring assembly comprises a helical compression spring.

25. The apparatus as defined in claim 22 wherein said spring assembly comprises a concentric double spring assembly.

26. A thermally isolated deployable shield for spacecraft having variable diameter capability, said shield being alternately positionable between a stowed configuration generally adjacent said craft and a deployed configuration a fixed distance therefrom, comprising:
- four relatively flexible lattice structures of length generally equal to that of said craft, said lattice structures capable of flexing to varying curvatures, comprising a lattice web to which is affixed relatively flexible ring members and relatively rigid upper and lower longitudinal members, said lower longitudinal members along the sides and centerline of said lattice structure;
- replaceable shield panels removably attached to said lattice structures with quick-acting floating fasteners allowing said shield panels to flex in conjunction with said lattice structures, said lattice structures and attached shield panels comprising four 90 degree lattice panels generally encircling said craft;
- foldable hinge assemblies disposed between and affixed to said lattice panels, said hinge assemblies being foldable when said shield is in said stowed configuration thereof and expandable when said shield is in said deployed configuration thereof so as to comprise make-up shielding material between said lattice panels providing continuous 360 degree radial coverage;
- thermally isolating actuation means for securing said lattice panels relative said craft and for driving said lattice panels from their stowed configuration to their deployed configuration, said actuation means comprising four medial spring actuators per said lattice panel disposed longitudinally relative said craft and slidably secured to said lattice structure's centerline lower longitudinal member and nonslidably secured to said craft's framework so that upon deployment said medial actuators translate said lattice panel outward a fixed distance dictated by said actuator, and eight side actuators oriented perpendicular said medial actuators and disposed generally equally along said lattice panel sides, said side actuators being slidably secured to said side lower longitudinal members of said lattice structure and nonslidably secured to said craft's framework so that upon deployment said side actuators locate said lattice panel edges radially outward matching the deployed distance of said medial actuators, said side and medial actuators slidably and nonslidably secured with thermally isolating bearing elements;
- restraining means for securing said shield relatively tight against said craft prior to deployment thereof, comprising a plurality of tension bands generally encircling and holding said shield against said craft's structural framework, and a pyrotechnically actuated tension bolt assembly holding said tension band together whereby upon actuation thereof said tension band releases allowing said shield to deploy;
- four flexure close-out assemblies per said lattice panel ends providing complete 360 degree annular space light sealing and protection, said assemblies comprising a plurality of flexure elements having cut-out reliefs permitting said flexure elements to flex with the varying curvatures of said lattice structure, and bushing arrangements acting between said flexure element cut-out reliefs for attaching said flexure elements to said lattice structure and said craft's close out and light seal assembly, said bushing arrangements comprising a thrust surface and a spring mechanism so that said flexure elements are held against said thrust surface by said spring mechanism.

* * * * *